(12) United States Patent  
Chen et al.

(10) Patent No.: US 9,366,914 B2  
(45) Date of Patent: Jun. 14, 2016

(54) LIQUID CRYSTAL PANEL AND LIQUID CRYSTAL DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Junsheng Chen, Beijing (CN); Dong Chen, Beijing (CN)

(73) Assignees: BOE TECHNOLOGY GROUP CO., LTD., Beijing (CN); HEFEI BOE OPTOELECTRONICS TECHNOLOGY CO., LTD, Hefei, Anhui (CN)

( * ) Notice: Subject to any disclaimer, the term of this patent is extended or adjusted under 35 U.S.C. 154(b) by 0 days.

(21) Appl. No.: 14/407,666

(22) PCT Filed: Jun. 30, 2014

(86) PCT No.: PCT/CN2014/081245  
§ 371 (c)(1),  
(2) Date: Dec. 12, 2014

(87) PCT Pub. No.: WO2015/100988  
PCT Pub. Date: Jul. 9, 2015

(65) Prior Publication Data  
US 2015/0346526 A1 Dec. 3, 2015

(30) Foreign Application Priority Data  
Dec. 31, 2013 (CN) .......................... 2013 1 0755457

(51) Int. Cl.  
*G02F 1/1339* (2006.01)  
*G02F 1/1335* (2006.01)  
(Continued)

(52) U.S. Cl.  
CPC ............ *G02F 1/1339* (2013.01); *G02F 1/1337* (2013.01); *G02F 1/133345* (2013.01); *G02F 1/133514* (2013.01); *G02F 1/134309* (2013.01); *G02F 2202/16* (2013.01)

(58) Field of Classification Search  
CPC ............ G02F 1/1339; G02F 1/133345; G02F 1/133514; G02F 1/1337; G02F 1/134309  
See application file for complete search history.

(56) References Cited

U.S. PATENT DOCUMENTS 6,738,109 B2 5/2004 Jeon  
7,092,047 B2 8/2006 Jeon  
(Continued)

FOREIGN PATENT DOCUMENTS

CN 1399161 A 2/2003  
CN 101241911 A 8/2008  
(Continued)

OTHER PUBLICATIONS

International Search Report, International Preliminary Report on Patentability and Written Opinion of the International Searching Authority of PCT/CN2014/081245 in Chinese, mailed Sep. 24, 2014.  
(Continued)

*Primary Examiner* — James Dudek  
(74) *Attorney, Agent, or Firm* — Collard & Roe, P.C.

(57) ABSTRACT

A liquid crystal panel and a liquid crystal display device are provided, and the liquid crystal panel comprises a color filter substrate and an array substrate which are bonded by a sealant doped with gold balls, wherein a gate shift register is provided on a side of the array substrate facing the color filter substrate, a conductive electrode connecting a gate electrode and source/drain electrodes is provided in a region of the gate shift register, and a common electrode is provided on a side of the color filter substrate facing the array substrate, and wherein the liquid crystal panel further includes an insulating layer located between the conductive electrode and the common electrode, a projection of the insulating layer on the side of the array substrate facing the color filter substrate covering a projection of the conductive electrode on the side of the array substrate facing the color filter substrate. The above solution provided above is beneficial to realize the slim bezel design of the liquid crystal panel.

18 Claims, 4 Drawing Sheets

(51) Int. Cl.
*G02F 1/1337* (2006.01)
*G02F 1/1343* (2006.01)
*G02F 1/1333* (2006.01)

(56) References Cited

U.S. PATENT DOCUMENTS

| | | | | |
|---|---|---|---|---|
| 2001/0051398 A1* | 12/2001 | Hirakata | ............. | G02F 1/13454 438/149 |
| 2006/0082718 A1* | 4/2006 | Yamazaki | ........... | G02F 1/13454 349/153 |
| 2010/0033455 A1 | 2/2010 | Kwak et al. | | |

FOREIGN PATENT DOCUMENTS

| | | |
|---|---|---|
| CN | 101957522 A | 1/2011 |
| CN | 103698954 A | 4/2014 |
| JP | 2000-214477 A | 8/2000 |

OTHER PUBLICATIONS

Chinese Office Action of Chinese Application No. 201310755457.9, mailed Sep. 22, 2015 with English translation.

* cited by examiner

LIQUID CRYSTAL PANEL AND LIQUID CRYSTAL DISPLAY DEVICE

CROSS REFERENCE TO RELATED APPLICATIONS

This application is the National Stage of PCT/CN2014/081245 filed on Jun. 30, 2014, which claims priority under 35 U.S.C. §119 of Chinese Application No. 201310755457.9 filed on Dec. 31, 2013, the disclosure of which is incorporated by reference.

TECHNICAL FIELD

Embodiments of the invention relate to a liquid crystal panel and a liquid crystal display device.

BACKGROUND

A thin film transistor liquid crystal display (TFT-LCD) exhibits advantages of small volume, low power consumption, zero radiation, etc., and thus has been developed rapidly in recent years and become a mainstream display in the present market.

A slim bezel structure becomes a very important trend in the future development of the TFT-LCD accompanying the rapid development of the TFT-LCD. The TFT-LCD mainly comprises a liquid crystal panel and a backlight module. The market demand for the TFT-LCD with a slim bezel is also reflected mainly on a peripheral structure of the liquid crystal panel.

A process of manufacturing the liquid crystal panel includes mainly: preparing a color filter substrate and an array substrate; then dropping liquid crystal on one of the color filter substrate and the array substrate and applying sealant on the other one of the color filter substrate and the array substrate; and at last bonding the array substrate and the color filter substrate in vacuum, and curing the sealant, thereby the array substrate and the color filter substrate being adhered by the sealant to form the liquid crystal panel.

The technique of arranging a shift register circuit on the array substrate (Gate On Array, GOA) is very important one of solutions for realizing a slim bezel design of the liquid crystal panel, which reduces the width of the periphery bezel by disposing driving circuits of gate electrodes in the array substrate, thereby achieving the slim bezel design of the liquid crystal panel. As shown in FIG. 1, a twisted nematic (TN) liquid crystal panel designed and manufactured by using the GOA technique includes an array substrate 02 and a color filter substrate 03 bonded by sealant 01 doped with gold balls, a gate shift register region, in which a gate electrode 04 and source/drain 05 are disposed at intervals, is located on a side of the array substrate 02 facing the color filter substrate 03, and the gate electrode 04 and the source/drain 05 are connected by a conductive electrode 06.

Since the conductive electrode 06 in the gate shift register region is exposed on a surface of the array substrate 02 facing the color filter substrate 03, in order to avoid the short circuit of the conductive electrode 06 caused by the contact between the gold balls in the sealant 01 and the conductive electrode 06, it is required that a determined safe distance, which should at least be ensured to be larger than the application precision of the sealant 01 to make sure no contact between the sealant 01 and the conductive electrode 06 upon occurring process fluctuation, must be maintained between the conductive electrode 06 and the sealant 01, and thus the structural characters of the liquid crystal panel make it relatively difficult to achieve the slim bezel design of the liquid crystal panel.

SUMMARY

An embodiment of the invention provides a liquid crystal panel comprising a color filter substrate and an array substrate which are bonded, wherein a gate shift register is provided on a side of the array substrate facing the color filter substrate, a conductive electrode connecting a gate electrode and source/drain electrodes is provided in a wiring region of the gate shift register, and a common electrode is provided on a side of the color filter substrate facing the array substrate, and wherein the liquid crystal panel further includes: an insulating layer located between the conductive electrode and the common electrode, a projection of the insulating layer on a side of the array substrate facing the color filter substrate covering a projection of the conductive electrode on a side of the array substrate facing the color filter substrate.

Another embodiment of the invention provides a liquid crystal device including the above liquid crystal panel.

BRIEF DESCRIPTION OF THE DRAWINGS

For better understanding technical proposals according to embodiments of the present invention, drawings of the embodiments will be described briefly below. Obviously, drawings in the following description only relate to some embodiments of the present invention, not to limit the present invention.

DETAILED DESCRIPTION

In order to make the purpose, technology solution and advantages of embodiments of the present invention more clear, technology solutions according to embodiments of the present invention will be described clearly and completely below with respect to drawings of embodiments of the present invention. It is to be understood that the described embodiments are part of but not all of embodiments of the present invention. Based on the described embodiments of the present invention, all other embodiments obtained by those of ordinary skill in the art without any creative labor fall into the protecting scope of the present invention.

Embodiment 1

Figure 2:
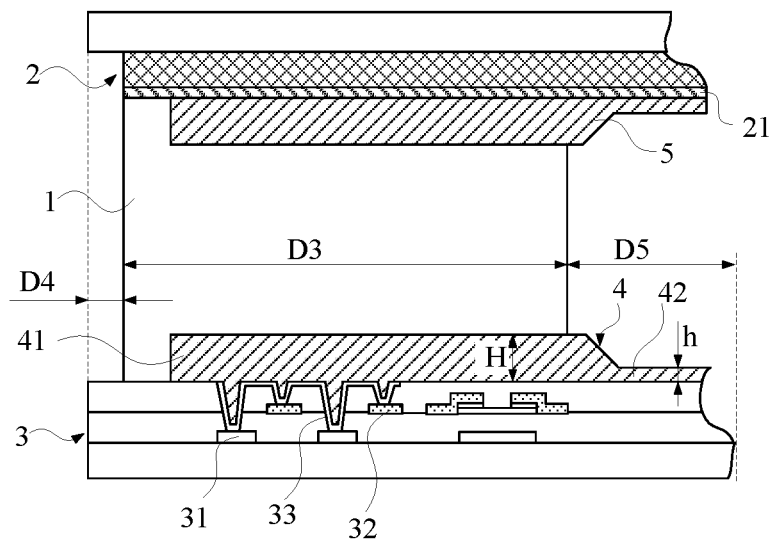
FIG. 2 is a schematic view showing an edge structure of a liquid crystal panel, in which an insulating layer is disposed on an array substrate, provided in an embodiment 1 of the invention.

Referring to FIG. 2, the embodiment 1 provides a liquid crystal panel that comprises: a color filter substrate 2 and an array substrate 3 bonded by sealant 1 doped with gold balls, wherein a gate shift register is provided on a side of the array substrate 3 facing the color filter substrate 2 and a conductive electrode 33 connecting a gate electrode 31 and source/drain electrodes 32 is provided in a wiring region of the gate shift register; and a common electrode 21 is provided on a side of the color filter substrate 2 facing the array substrate 3. In addition, the liquid crystal panel provided in the present embodiment further includes: an insulating layer located between the conductive electrode 33 and the common electrode 21, wherein a projection of the insulating layer on the side of the array substrate 3 facing the color filter substrate 2 covers a projection of the conductive electrode 33 on the side of the array substrate 3 facing the color filter substrate 2.

In the liquid crystal panel provided in the embodiment 1, since the projection of the insulating layer on the side of the array substrate 3 facing the color filter substrate 2 covers the projection of the conductive electrode 33 on the side of the array substrate 3 facing the color filter substrate 2 and the insulating layer is interposed between the conductive electrode 33 and the common electrode 21, even if the sealant 1 doped with the gold balls is applied between the conductive electrode 33 and the common electrode 21, a conducting path between the conductive electrode 33 and the common electrode 21 will be interrupted by the insulating layer, and accordingly the short circuit between the conductive electrode 33 and the common electrode 21 will not be caused. Therefore, it is not needed to keep away from the conductive electrode 33 in the wiring region of the gate shift register upon applying the sealant 1, so that the distance between the sealant 1 doped with the gold balls and the gate shift register may be configured to be very small and a portion of the sealant 1 may even be applied directly in a region that is right above the gate shift register, so as to slim the bezel of the whole liquid crystal panel.

Figure 1:
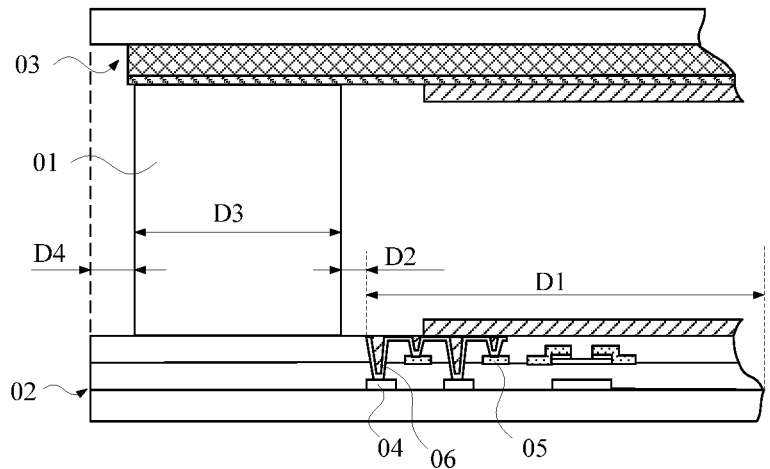
FIG. 1 is a schematic view showing an edge structure of a liquid crystal panel.

For example, the bezel width L of the liquid crystal panel shown in FIG. 1 equals to the sum of D1, D2, D3, and D4, i.e., L=D1+D2+D3+D4, in which D1 is the width of the wiring region of the gate shift register and is relatively constant in general for liquid crystal panels having the same size; D2 is the safe distance between the sealant 01 and the conductive electrode 06; D3 is the width in which the sealant 01 is applied and depends mainly on the precision of an apparatus for applying the sealant; and D4 is a distance between a side of the sealant 01 opposite to a display region of the liquid crystal panel and an edge of a corresponding side of the liquid crystal panel and depends mainly on a precision of a cutting apparatus. In a case where the apparatus for applying the sealant and the cutting apparatus are kept unchanged, D3 and D4 are also relatively constant. It can be known that the larger safe distance D2 between the sealant 01 and the conductive electrode 06 in the wiring region of the gate shift register is more unbeneficial to realizing the slim bezel design of the liquid crystal panel.

As shown in FIG. 2, the bezel width L of the liquid crystal panel provided in embodiment 1 of the invention equals to the sum of D3, D4, and D5, i.e., L=D3+D4+D5, wherein D3 is the width in which the sealant 1 is applied, D4 is a distance between a side of the sealant 01 opposite to a display region of the liquid crystal panel and an edge of a corresponding side of the liquid crystal panel, and D5 is a distance between a side of the sealant 1 facing the display region of the liquid crystal panel and an edge of the display region. Therefore, compared to the liquid crystal panel shown in FIG. 1, the insulating layer can prevent the gold balls in the sealant 1 from contacting the conductive electrode 33 in the wiring region of the gate shift register in the liquid crystal panel provided in the present embodiment 1, and thus the safe distance D2 between the sealant 1 and the conductive electrode 33 may be of zero, and a portion of the sealant 1 may even be applied to a surface of the insulating layer, so that a projection of the sealant 1 on the side of the array substrate 3 facing the color filter substrate 2 contact or even partially overlay the projection of the conductive electrode 33 on the side of the array substrate 3 facing the color filter substrate 2. In this way, the distance D5 between the side of the sealant 1 facing the display region of the liquid crystal panel and the edge of the display region of the liquid crystal panel is only a portion of the width D1 of the wiring region of the gate shift register in the liquid crystal panel shown in FIG. 1, and thus, compared to the liquid crystal panel shown in FIG. 1, the liquid crystal panel provided in embodiment 1 of the invention may have a relative small bezel width.

Therefore, the liquid crystal panel provided in embodiment 1 of the invention is beneficial to realizing the slim bezel design of the liquid crystal panel.

Referring to FIG. 2 again, in some embodiments, the projection of the sealant 1 on the side of the array substrate 3 facing the color filter substrate 2 and the projection of the insulating layer on the side of the array substrate 3 facing the color filter substrate 2 have overlaying regions.

In this way, in the case where the width D3 in which the sealant 1 is applied is kept unchanged, the distance between the side of the sealant 1 facing the display region of the liquid crystal panel and the edge of the display region of the liquid crystal panel is decreased in the liquid crystal panel provided by the embodiment, which thereby makes it possible for the bezel of the whole liquid crystal panel to be smaller and is more beneficial to achieving the slim bezel design of the liquid crystal panel of the invention.

Figure 6:
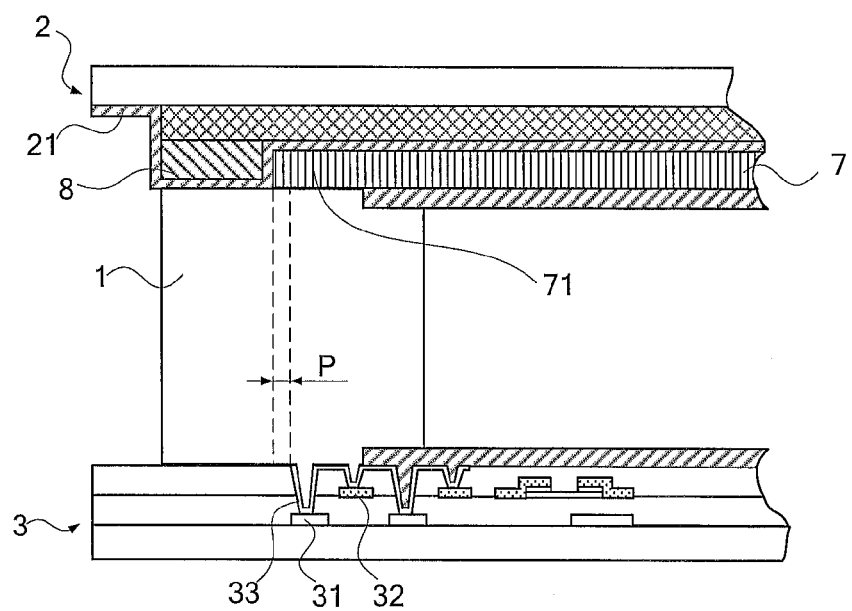
FIG. 6 is a schematic view showing an edge structure of a liquid crystal panel, in which an insulating layer is disposed on a color filter substrate, provided in embodiment 1 of the invention.

Referring to FIGS. 2 and 6, in the liquid crystal panel provided in the present embodiment 1, the above mentioned insulating layer may be disposed in the following two ways.

The First Way

Figure 3:
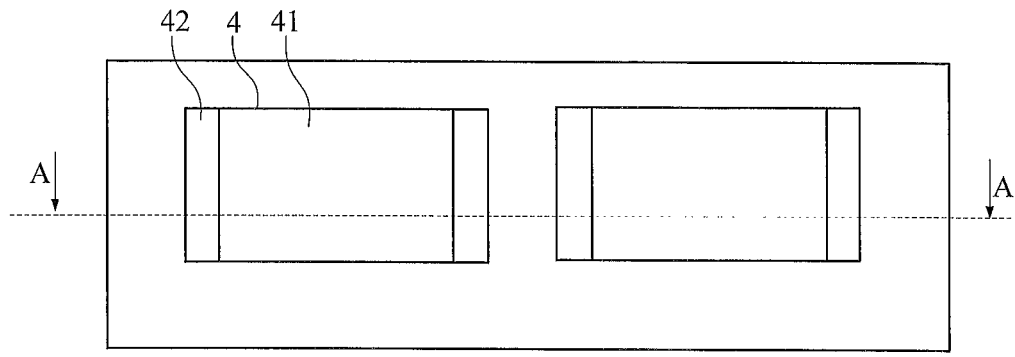
FIG. 3 is a schematic view showing a structure of a first alignment film in the liquid crystal panel, in which the insulating layer is disposed on the array substrate, provided in the embodiment 1 of the invention.
Figure 4:
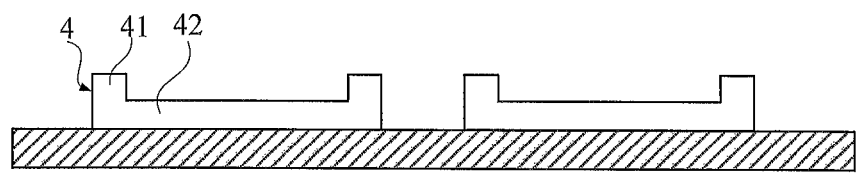
FIG. 4 is a schematic view showing a structure in a cross section taken along line A-A in FIG. 3.

Referring to FIG. 2, particularly, a first alignment film 4 is disposed on the side of the above mentioned array substrate 3 facing the color filter substrate 2, and as shown in FIGS. 3 and 4, the first alignment film 4 has an insulating portion 41 covering the gate shift register to form the above mentioned insulating layer and an alignment portion 42 facing a liquid crystal layer in the liquid crystal panel to provide liquid crystal molecules in the liquid crystal layer with an initial orientation.

The insulating portion 41 of the first alignment film 4 covers the gate shift register, so that the conductive electrode 33 in the wiring region of the gate shift register will not be exposed on a surface of the side of the array substrate 3 facing the color filter substrate 2, and thus there is no possibility of occurring the problem that the gold balls in the sealant 1 contact the conductive electrode 33 to cause the short circuit of the conductive electrode 33, so that the distance between the sealant 1 doped with the gold balls and the gate shift register may be configured to be very small and a portion of the sealant 1 may be applied even directly on a surface of the insulating portion 41 of the first alignment film 4 over the gate shift register so as to decrease the bezel of the whole liquid crystal panel and thereby be beneficial to realizing the slim bezel design of the liquid crystal panel.

Referring to FIGS. 2 and 4 again, on the basis of the above first way, a thickness H of the insulating portion 41 in the first alignment film 4 is larger than a thickness h of the alignment portion 42 in some embodiments.

Since the thickness of the insulating portion 41 of the first alignment film 4 is increased, the damage of the insulating portion 41, which is caused by the friction between the gold balls and the insulating portion 41 upon applying the sealant 1 on the surface of the insulating portion 41, is prevented, so that the insulating effect of the insulating portion 41 in the first alignment film 4 may be enhanced and it is further beneficial to avoiding occurrence of the problem that the gold balls in the sealant 1 contact the conductive electrode 33 in the wiring region of the gate shift register to cause the short circuit of the conductive electrode 33.

More particularly, the thickness H of the insulating portion 41 in the first alignment film 4 is larger than 2000 Å, and the thickness h of the alignment portion 42 in the first alignment film 4 is in a range of 600 Å to 1200 Å. In this way, the insulating effect of the insulating portion 41 in the first alignment film 4 is enhanced while the alignment portion 42 of the first alignment film 4 may be enabled to meet the requirement of providing the liquid crystal molecules with the initial orientation.

Referring to FIG. 2, on the basis of the above first way, a second alignment film 5 is provided on a side of the above mentioned color filter substrate 2 facing the array substrate 3 in some embodiments, and may have, for example, the same structure of the first alignment film 4.

In this way, the second alignment film 5 and the first alignment film 4 may be printed on a same alignment film printing plate without the need of separately designing and manufacturing an alignment film printing plate for the second alignment film 5, so that the cost for manufacturing the liquid crystal panel provided by the invention may be reduced.

Figure 5:
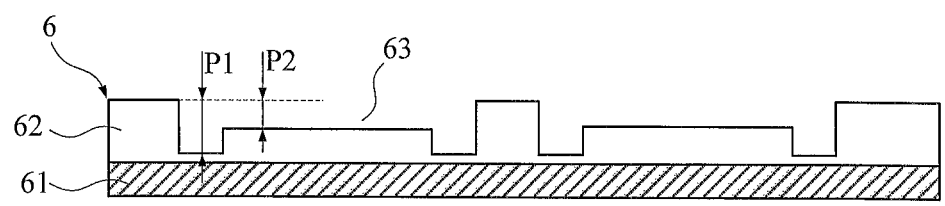
FIG. 5 is a schematic view showing a structure of an alignment film printing plate for printing the first alignment film provided in the embodiment 1 of the invention.

Referring to FIG. 5, on the basis of the above first way, the invention may further provide an alignment film printing plate 6 for printing the first alignment film 4 provided in the above mentioned first way, which includes a base plate 61 and a photosensitive resin APR plate 62 disposed on the base plate 61 and having an alignment film groove 63 that has an opening opposite to the base plate 61 and matches the structure of the first alignment film 4.

Upon printing the first alignment film 4 using the alignment film printing plate 6, a liquid-stated alignment film is injected into the alignment film groove 63 of the APR plate 62, and a substrate is disposed at the opening of the alignment film groove 63 to cover it. The liquid-stated alignment film is fixed to a surface of the substrate after being cured to form the first alignment film 4.

In particular, the depth P1 of a portion of the alignment film groove 63 of the alignment film printing plate 6 which corresponds to the insulating portion 41 of the first alignment film 4 is larger than the depth P2 of a portion of the alignment film groove 63 which corresponds to the alignment portion 42 of the first alignment film 4.

Based on the advantages which the first alignment film 4 in the above first way has, the first alignment film 4 printed by using the alignment film printing plate 6 may be used in the liquid crystal panel, and can be beneficial to realize the slim bezel design of the liquid crystal panel.

The Second Way

Referring to FIG. 6, in particular, a spacer layer 7 is provided on a side of the color filter substrate 2 facing the array substrate 3 and has an insulating portion 71 facing the gate shift register to form the above mentioned insulating layer, and a projection of the insulating portion 71 on the side of the array substrate 3 facing the color filter substrate 2 covers the projection of the conductive electrode 33 on the side of the array substrate 3 facing the color filter substrate 2.

The insulating portion 71 of the spacer layer 7 may interrupt the electrical conduction path between the conductive electrode 33 and the common electrode 21, and prevents occurrence of the problem that the gold balls in the sealant 1 causes the short circuit of the conductive electrode 33 and the common electrode 21, so that the distance between the sealant 1 doped with the gold balls and the gate shift register may be configured to be very small and a portion of the sealant 1 may even be applied directly on the gate shift register, so as to decrease the bezel of the whole liquid crystal panel and be beneficial to realize the slim bezel design of the liquid crystal panel.

On the basis of the above second way, in some embodiments, there is a predetermined distance P between an edge of the projection of the insulating portion 71 of the spacer layer 7 on the side of the array substrate 3 facing the color filter substrate 2 and an edge of a projection of the gate shift register on the side of the array substrate 3 facing the color filter substrate 2. In this case, it can be ensured that, upon bonding the color filter substrate 2 and the array substrate 3, it will not be caused that the gold balls in the sealant 1 lead to the short circuit of the common electrode 21 and the conductive electrode 33, even if a relative shift occurs.

In general, the value of the predetermined distance P is needed to be larger than the bonding precision of the liquid crystal panel, and the bonding precision of the liquid crystal panel is in the range of 0 to 10 μm. Therefore, in some embodiments, the value of the predetermined distance P may be set as 10 μm.

Referring to FIG. 6 again, on the basis of the above second way, in some embodiments, the liquid crystal panel provided in the invention may further include a liner 8, which is disposed in an bonding region of the color filter substrate 2 and located on a side of the common electrode 21 opposite to the array substrate 3 so as to level a side of the common electrode 21 facing the array substrate 3 with a side of the insulating portion 71 of the spacer layer 7 facing the array substrate 3.

The providing of the liner 8 makes sure that the side of the common electrode 21 facing the array substrate 3 is leveled with the side of the insulating portion 71 of the spacer layer 7 facing the array substrate 3, so that the application precision upon applying the sealant 1 on the side of the color filter substrate 2 facing the array substrate 3 can be enhanced, and the adhesion strength of the sealant 1 and the color filter substrate 2 after bonding is further ensured.

In some embodiments, the above liner 8 may be formed of the same material of the color filter layers in the color filter substrate 2, and may be formed with one of red, green, and blue color layers in the color filter layer simultaneously.

Figure 7A:
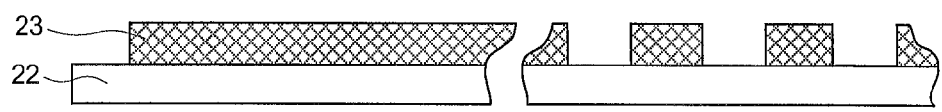
FIGS. 7a through 7f are schematic views showing a process for manufacturing the color filter substrate in the liquid crystal panel, in which the insulating layer is disposed on the color filter substrate, provided by embodiment 1 of the invention.
Figure 7B:
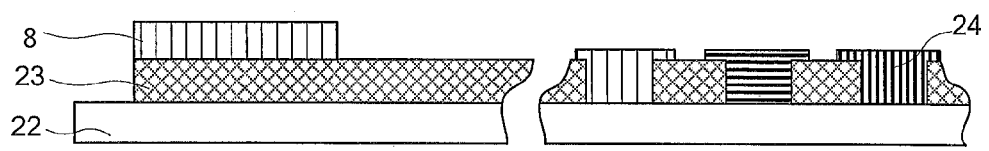
Figure 7C:
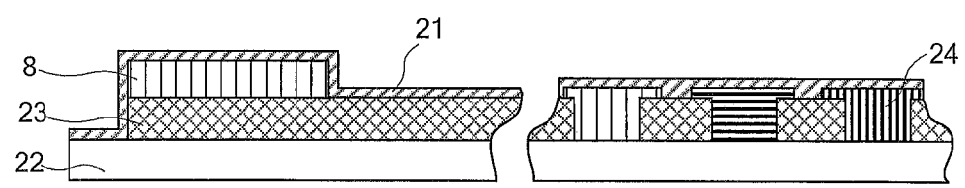
Figure 7D:
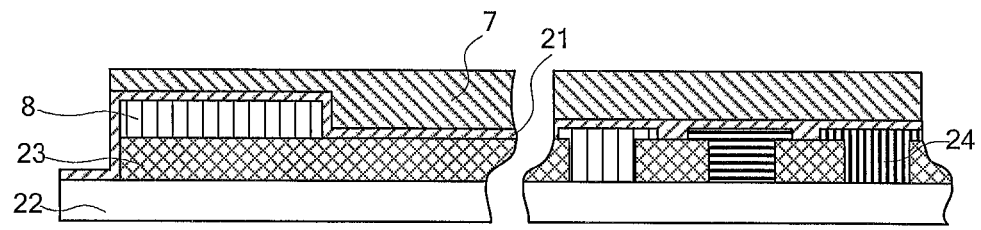
Figure 7E:
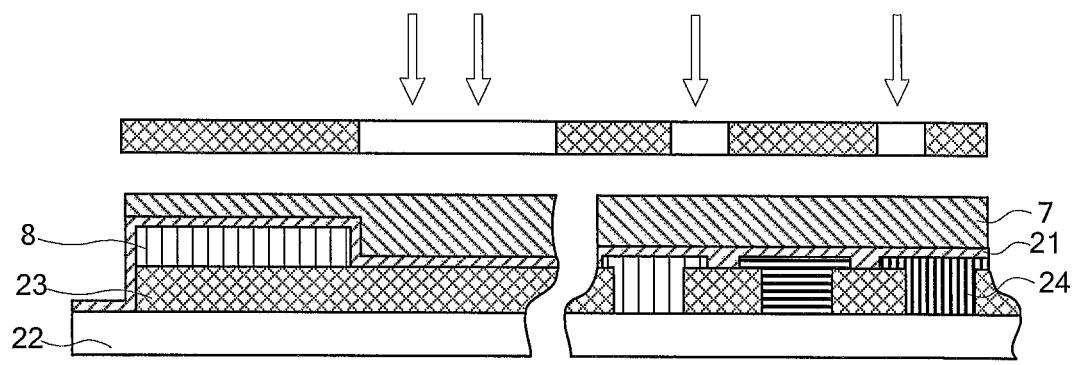
Figure 7F:
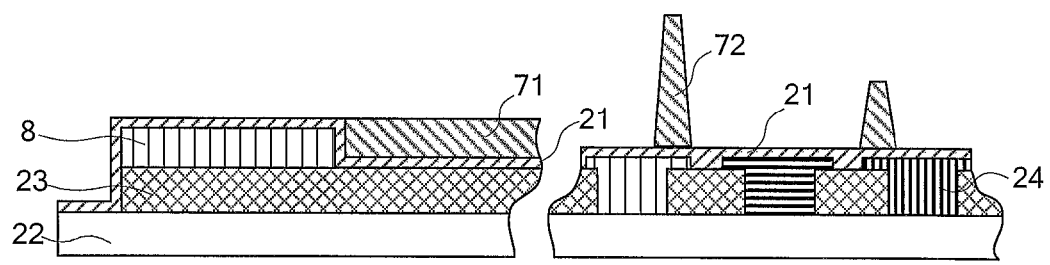

In addition, the color filter substrate 2 having the spacer layer 7 provided by the above second way may be formed by the following method, which includes:

Step 1, referring to FIG. 7a, forming a black matrix 23 on a glass substrate 22;

Step 2, referring to FIG. 7b, forming a color filter layer 24 in transmission regions of the black matrix 23;

Step 3, referring to FIG. 7c, forming the common electrode 21 on a side of the color filter layer 24 opposite to the glass substrate 22;

Step 4, referring to FIG. 7d, applying a solution of spacer on a side of the common electrode 21 opposite to the glass substrate 22 to form the spacer layer 7;

Step 5, referring to FIGS. 7e and 7f, performing an exposure process to form the spacer layer 7 into columnar spacers 72 on the common electrode 21 in a region of the color filter layer 24 and form the insulating portion 71 of the spacer layer 7 on the common electrode 21 at an edge of the glass substrate 22.

Since the insulating portion 71 of the spacer layer 7 may cover a portion of the common electrode 21 on the color filter substrate 2 which faces the gate shift register region, the gold balls in the sealant 1 can not contact the common electrode 21, so that the distance between the sealant 1 doped with the gold balls and the gate shift register may be configured to be very small and a portion of the sealant 1 may even be applied directly on the gate shift register, so as to decrease the bezel of the whole liquid crystal panel. Therefore, the color filter substrate 2 prepared through the above method may be used in the liquid crystal panel, so as to be beneficial to realize the slim bezel design of the liquid crystal panel.

Certainly, in Step 2, the liner 8 may be formed simultaneously on the black matrix 23 at the edge of the glass substrate 22 during the formation of the color filter layers 24.

Embodiment 2

The embodiment 2 of the invention further provides a liquid crystal display device that includes the liquid crystal panel provided in the above embodiment 1.

Since the insulating layer is interposed between the common electrode 21 and the conductive electrode 33 in the liquid crystal panel provided by the above solution, in a case where the width in which the sealant 1 is applied keeps unchanged, the distance between the sealant 1 and the gate shift register may be configured to be very small and a portion of the sealant 1 may even be applied in a region that is right above the gate shift register, so as to decrease the bezel of the liquid crystal panel. Therefore, in the liquid crystal display device including the above liquid crystal panel provided by the invention, the bezel of the liquid crystal display device may also be relative small so as to be beneficial to realize the slim bezel design of the liquid crystal display device.

The above embodiments are only for the purpose of describing technical proposal of the present invention rather than limiting it. While the present invention has been described in detail with reference to the above-mentioned embodiments, those of ordinary skill in the art should understand that they can modify the technical solution recorded in the above embodiments or conduct equivalent substitution for a part of technical features thereof and these modifications or substitutions will not make the nature of respective technical solution to depart from the spirit and scope of technical solutions of embodiments of the present invention.

This application claims the priority benefit of Chinese Patent Application No. 201310755457.9 filed on Dec. 31, 2013, the disclosure of which is incorporated herein as a part of the application in its entirety by reference.

The invention claimed is:

1. A liquid crystal panel comprising a color filter substrate and an array substrate which are bonded, wherein a gate shift register is provided on a side of the array substrate facing the color filter substrate, a conductive electrode connecting a gate electrode and source/drain electrodes is provided in a wiring region of the gate shift register, and a common electrode is provided on a side of the color filter substrate facing the array substrate, and wherein the liquid crystal panel further includes:

an insulating layer located between the conductive electrode and the common electrode, a projection of the insulating layer on the side of the array substrate facing the color filter substrate covering a projection of the conductive electrode on the side of the array substrate facing the color filter substrate, and wherein a projection of a sealant on the side of the array substrate facing the color filter substrate and the projection of the insulating layer on the side of the array substrate facing the color filter substrate have overlaying regions.

2. The liquid crystal panel of claim 1, wherein a first alignment film is disposed on the side of the array substrate facing the color filter substrate, and has an insulating portion that covers the gate shift register to form the insulating layer and an alignment portion that faces a liquid crystal layer in the liquid crystal panel to provide liquid crystal molecules in the liquid crystal layer with an initial orientation.

3. The liquid crystal panel of claim 2, wherein, in the first alignment film, the thickness of the insulating portion is larger than the thickness of the alignment portion.

4. The liquid crystal panel of claim 3, wherein the thickness of the insulating portion in the first alignment film is larger than 2000 Å, and the thickness of the alignment portion in the first alignment film is in a range of 600 Å to 1200 Å.

5. The liquid crystal panel of claim 2, wherein a second alignment film is provided on the side of the color filter substrate facing the array substrate, and has the same structure as that of the first alignment film.

6. The liquid crystal panel of claim 1, wherein a spacer layer is provided on the side of the color filter substrate facing the array substrate and has an insulating portion facing the gate shift register to form the insulating layer, and a projection of the insulating portion on the side of the array substrate facing the color filter substrate covers the projection of the conductive electrode on the side of the array substrate facing the color filter substrate.

7. The liquid crystal panel of claim 6, wherein there is a predetermined distance between an edge of the projection of the insulating portion on the side of the array substrate facing the color filter substrate and an edge of a projection of the gate shift register on the side of the array substrate facing the color filter substrate.

8. The liquid crystal panel of claim 7, wherein the predetermined distance is of 10 μm.

9. The liquid crystal panel of claim 6, further comprising:
a liner disposed in a bonding region of the color filter substrate and located on a side of the common electrode opposite to the array substrate so as to level a side of the common electrode facing the array substrate with a side of the insulating portion facing the array substrate.

10. The liquid crystal panel of claim 1, wherein the array substrate and the color filter substrate are bonded by the sealant doped with gold balls.

11. A liquid crystal display device including the liquid crystal panel of claim 1.

12. The liquid crystal display device of claim 11, wherein a first alignment film is disposed on the side of the array substrate facing the color filter substrate, and has an insulating portion that covers the gate shift register to form the insulating layer and an alignment portion that faces a liquid crystal layer in the liquid crystal panel to provide liquid crystal molecules in the liquid crystal layer with an initial orientation.

13. The liquid crystal display device of claim 12, wherein, in the first alignment film, the thickness of the insulating portion is larger than the thickness of the alignment portion.

14. The liquid crystal display device of claim 12, wherein a second alignment film is provided on the side of the color filter substrate facing the array substrate, and has the same structure as that of the first alignment film.

15. The liquid crystal display device of claim 11, wherein a spacer layer is provided on the side of the color filter substrate facing the array substrate and has an insulating portion facing the gate shift register to form the insulating layer, and a projection of the insulating portion on the side of the array substrate facing the color filter substrate covers the projection of the conductive electrode on the side of the array substrate facing the color filter substrate.

16. The liquid crystal display device of claim 15, wherein there is a predetermined distance between an edge of the projection of the insulating portion on the side of the array substrate facing the color filter substrate and an edge of a projection of the gate shift register on the side of the array substrate facing the color filter substrate.

17. The liquid crystal display device of claim 15, further comprising:
   a liner disposed in a bonding region of the color filter substrate and located on a side of the common electrode opposite to the array substrate so as to level a side of the common electrode facing the array substrate with a side of the insulating portion facing the array substrate.

18. The liquid crystal display device of claim 11, wherein the array substrate and the color filter substrate are bonded by the sealant doped with gold balls.

\* \* \* \* \*